Sept. 29, 1936.  F. STEINECKE  2,055,594

VEHICLE BODY

Filed June 14, 1932

Inventor:

Patented Sept. 29, 1936

2,055,594

UNITED STATES PATENT OFFICE 2,055,594

VEHICLE BODY

Fritz Steinecke, Sindelfingen, near Stuttgart, Germany, assignor to Daimler Benz Aktiengesellschaft, Stuttgart-Unterturkheim, Germany, a company of Germany Application June 14, 1932, Serial No. 617,167
In Germany June 15, 1931

1 Claim. (Cl. 280—106)

The present invention relates to vehicles, especially to vehicles with frameless bodies such as motor omnibuses and trolley buses, the body frame work of which comprises cross sills and window frame members which are preferably in one piece with the roof cross members and longitudinal frame members.

The longitudinal sill members are of tubular section, pass through the cross sill members and are provided with external screw threads on which flanges are screwed for securing the cross members to the longitudinal members.

The tubular section of the longitudinal members offers the advantage of being resistant against bending in all directions and at the same time allowing of a simple and useful connection thereof with the cross sill members. The longitudinal sill members are, in the preferred construction continuous.

The lower horizontal portion of the cross members is made so deep or otherwise provided with a section such that the openings for the longitudinal sill members do not weaken the cross sills. The connection of the longitudinal and cross sill members by the screwed flanges provides an opportunity of regulating in a very simple manner the distance apart of the cross members. The suspension springs of the wheels are supported in a most advantageous manner by means of sockets embracing the tubular sill members.

In the drawing is shown by way of example a vehicle body of the closed type constructed in accordance with the invention.

Figure 1:
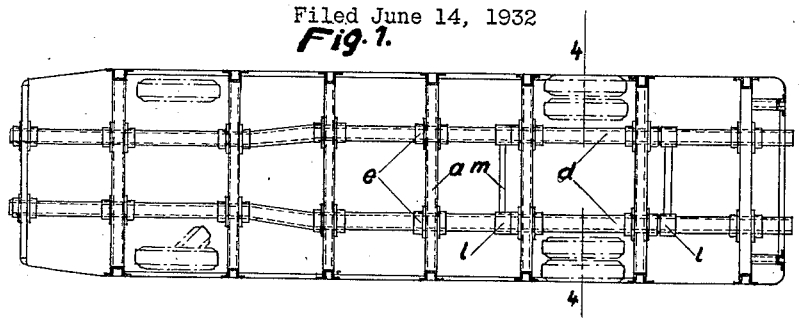
Fig. 1 is a plan view.
Figure 2:
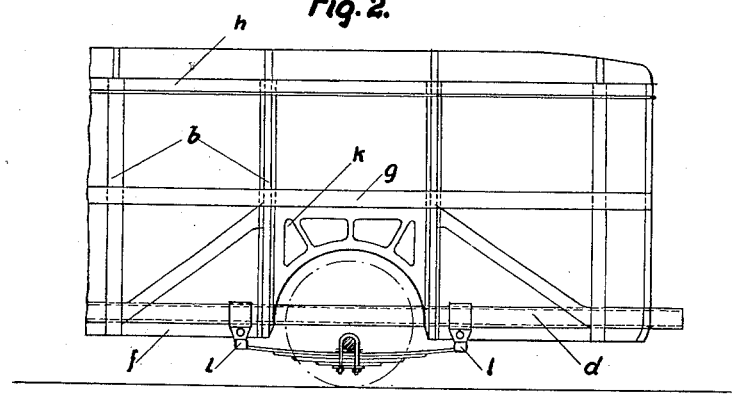
Fig. 2 is a part side elevation.
Figure 3:
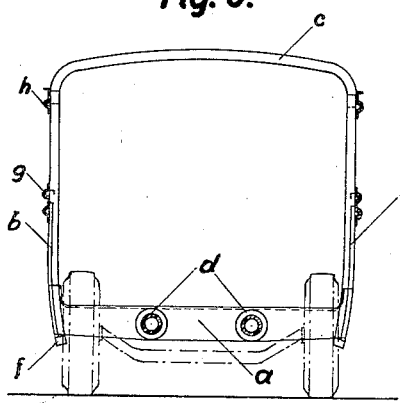
Fig. 3 is a front end view.
Figure 4:
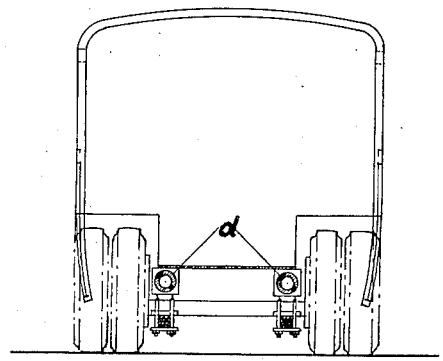
Fig. 4 is a vertical cross section taken on the line 4—4 of Fig. 1.

Referring to the drawing, the body frame comprises cross sill members $a$ of channel section with laterally extending flanges forming together with the vertical window frame members $b$, also of channel section and provided with lateral flanges, and with the upper roof cross members $c$, closed ring frame members. The cross sill members $a$ are connected together by longitudinal sill members constructed as steel tubes $d$ which pass through openings provided in the cross sill members and are secured to the cross sill members $a$ by means of flanges or round nuts $e$ or otherwise, the cross sill members being spaced apart parallel to one another.

For stiffening the side walls, auxiliary longitudinal member $f$, serving as an outer frame, car line sill members $g$ beneath the windows and upper reinforcing strips $h$ are provided.

The members $f$, $g$ and $h$ are carried around the whole body or only along the side walls. The body is furtherly stiffened by reinforcing members $i$ and bridge members $k$ which form a self-supporting device together with the side walls.

The suspension springs for the front and back axles are secured to the tubular longitudinal sill members by sockets $l$, encircling the longitudinal sill members, transverse strut rods $m$ being provided between the sockets. The wheels are provided at the outer sides of the tubular members $b$ and beween two adjacent vertical frame members $b$ and between two adjacent vertical frame members $a$.

The arrangement offers the advantage that the driving units such as the engine can be accommodated between the tubular sill members in a suitable manner, for instance between the tubular longitudinal sill members at the end of the vehicle. There may be provided two or more driving axles, one or more engines being fitted. The same type of body may be provided for closed vehicles or open vehicles, all these types being within the scope of the invention.

What I claim is:—

In a vehicle, a self supporting body comprising in combination cross sill members having openings therein, tubular longitudinal sill members passed through said openings, fixing means for securing the longitudinal and cross sill members together, sockets for receiving the ends of leaf suspension springs, said sockets embracing the longitudinal sill members in opposition to one another in spaced relationship for connecting the suspension springs to the longitudinal sill members in the regions of the axles and distance rods connected to the opposed sockets for preventing the latter from turning on the longitudinal sill members.

FRITZ STEINECKE.